_(12)_ United States Patent
Ban et al.

(10) Patent No.: US 7,444,163 B2
(45) Date of Patent: Oct. 28, 2008

(54) MOBILE DIGITAL DEVICES

(75) Inventors: Takeshi Ban, Gifu (JP); Atsushi Furukawa, Gifu (JP); Akiko Inami, Gifu (JP); Yachiyo Itou, Mizuho (JP); Takashi Sugiyama, Gifu (JP); Noriyoshi Usui, Ogaki (JP); Masao Nakada, Seki (JP)

(73) Assignee: Sanyo Electric Co., Ltd, Moriguchi-shi (JP)

( * ) Notice: Subject to any disclaimer, the term of this patent is extended or adjusted under 35 U.S.C. 154(b) by 0 days.

(21) Appl. No.: 10/529,399

(22) PCT Filed: Sep. 26, 2003

(86) PCT No.: PCT/JP03/12378

§ 371 (c)(1),
(2), (4) Date: Mar. 28, 2005

(87) PCT Pub. No.: WO2004/031930

PCT Pub. Date: Apr. 15, 2004

(65) Prior Publication Data

US 2006/0038789 A1    Feb. 23, 2006

(30) Foreign Application Priority Data

Sep. 30, 2002  (JP) ............................. 2002-287076
Mar. 12, 2003  (JP) ............................. 2003-066367
Mar. 28, 2003  (JP) ............................. 2003-090717
Jun. 24, 2003  (JP) ............................. 2003-180190

(51) Int. Cl.
*H04M 1/00* (2006.01)

(52) U.S. Cl. ............... 455/550.1; 379/368; 379/433.06; 379/433.07; 345/168; 345/169; 345/170

(58) Field of Classification Search .............. 455/550.1, 455/566, 575.1, 575.3; 345/168, 169, 170; 379/368, 433.06, 433.07
See application file for complete search history.

(56) References Cited

U.S. PATENT DOCUMENTS 5,959,615  A      9/1999  Yamade et al.

(Continued)

FOREIGN PATENT DOCUMENTS

EP     1054550 A2 *  11/2000

(Continued)

OTHER PUBLICATIONS

Japanese Notice of Rejection dated Mar. 13, 2007, Application No. 2003-180190.

(Continued)

*Primary Examiner*—Nay Maung
*Assistant Examiner*—Janelle N. Young
(74) *Attorney, Agent, or Firm*—Westerman, Hattori, Daniels & Adrian, LLP.

(57) ABSTRACT

A mobile digital device comprises a ten-key pad being comprised of a key mat 21 on which ten-key buttons 21a-21c with respective projections 21aa-21cc on the under surfaces thereof are laid out and a key circuit board on which respective contacts 22a-22c corresponding to the projections are laid out, an electrostatic capacity sensing pad 30 for sensing an electrostatic capacity change to detect a touched region and having through holes to be inserted the projections corresponding thereto and being provided with between the key mat 21 and the key circuit board 22, and a controller for selecting a function corresponded to a feature of the touched region detected by the electrostatic capacity sensing pad and executing the selected function. Owing to such constructions, a desired function can be selected by way of finger touching to the mobile digital device.

23 Claims, 12 Drawing Sheets

U.S. PATENT DOCUMENTS

| | | | |
|---|---|---|---|
| 6,498,600 B1 * | 12/2002 | Vance et al. | 345/168 |
| 6,680,676 B1 * | 1/2004 | Hayashi et al. | 341/22 |
| 2002/0049070 A1 * | 4/2002 | Bick | 455/550 |
| 2003/0001899 A1 * | 1/2003 | Partanen et al. | 345/800 |
| 2003/0201983 A1 * | 10/2003 | Jokinen et al. | 345/169 |
| 2004/0077373 A1 * | 4/2004 | Choi et al. | 455/550.1 |
| 2005/0048955 A1 * | 3/2005 | Ring | 455/414.1 |

FOREIGN PATENT DOCUMENTS

| | | |
|---|---|---|
| GB | 2367530 A | 4/2002 |
| JP | 08-30189 | 2/1996 |
| JP | 08-129473 | 5/1996 |
| JP | 8-129473 A | 5/1996 |
| JP | 08-272516 | 10/1996 |
| JP | 8-272516 A | 10/1996 |
| JP | 9-207412 A | 8/1997 |
| JP | 10-097504 | 4/1998 |
| JP | 11-119911 | 4/1999 |
| JP | 11-119911 A | 4/1999 |
| JP | 11-212726 | 8/1999 |
| JP | 11-212726 A | 8/1999 |
| JP | 2001-005599 | 1/2001 |
| JP | 2001-5599 A | 1/2001 |
| JP | 2001-084056 | 3/2001 |
| JP | 2001-266695 | 9/2001 |
| JP | 2002-007131 | 1/2002 |
| JP | 2002-196856 | 7/2002 |
| JP | 2004-535712 | 11/2004 |

OTHER PUBLICATIONS

Japanese Decision of Refusal dated Jul. 3, 2007, Application No. 2003-180190.

Japanese Office Action dated Jun. 20, 2006.

Korean Office Action dated Oct. 30, 2007, Application No. 10-2007-7018410.

* cited by examiner (b)
SIZE-FUNCTION TABLE (FOR BBBB GAME)

| SIZE (NUMBER OF DOTS) | FUNCTION |
|---|---|
| EQUIVALENT TO END OF FINGERTIP | MOVEMENT TO LOWER LEFT |
| EQUIVALENT TO ENTIRETY OF FINGERTIP | MOVEMENT TO UPPER LEFT |
| EQUIVALENT TO PAD OF FINGER | MOVEMENT TO UPPER RIGHT |

(a)

(b)
DIRECTION-FUNCTION TABLE (FOR CCCC GAME)

| DIRECTION (°) | FUNCTION |
|---|---|
| 0 - 45 | MOVEMENT TO LOWER LEFT |
| 45 - 90 | MOVEMENT TO UPPER LEFT |
| 90 - 135 | MOVEMENT TO UPPER RIGHT |
| 135 - 180 | MOVEMENT TO LOWER RIGHT |

(a)

(b) NUMBER OF TOUCHED REGION - FUNCTION TABLE (FOR AAAA GAME)

| NUMBER OF TOUCHED REGION | FUNCTION |
| --- | --- |
| 2 | MOVEMENT TO LOWER LEFT |
| 3 | MOVEMENT TO UPPER LEFT |
| 4 | MOVEMENT TO UPPER RIGHT |

MOBILE DIGITAL DEVICES

TECHNICAL FIELD

This invention relates to portable mobile digital devices, such as mobile wireless telephones, personal digital assistances (PDA) and notebook personal computers (hereinafter refereed to as "mobile wireless telephones, etc."), more particularly, to the mobile wireless telephones, etc. equipped with a ten-key pad and an electrostatic capacity sensing pad, respectively, and still more particularly, to the mobile wireless telephones, etc. capable of realizing a desired function according to how an operator touches an operation-input part with his/her finger.

BACKGROUND ART

There has been disclosed a user interface device having key-in functions similar to those available conventionally and an input function of a finger touch detecting pad that detects finger touches (i.e., user interface device for the mobile wireless telephones, etc.) by composing a key pad with a key mat equipped with an electrostatic capacitance sensing plate in the lower part thereof in the Japanese Unexamined Patent Publication No. 2002-196856.

However, the mobile wireless telephones, etc. having functions of detecting how an operator touches the mobile wireless telephones, etc. with his/her finger and realizing a desired function according to how an operator touches an operation-input part with his/her finger are unbeknown.

A digital device having a function of recognizing characters handwritten on a touch pad with a stylus pen or the like inputs separately a breakpoint between a handwritten character and the next handwritten character.

DISCLOSURE OF INVENTION

Technical Problems

Mobile digital devices, such as the mobile wireless telephones, etc., are limited in operation-input functions due to the narrow area of operation-input part thereof.

An object of this invention is to make it possible for mobile digital devices with the narrow area of operation-input part like the mobile wireless telephones, etc. to perform the operation input of various functions.

Specifically, this object of this invention is, for example, to make it possible for the ten-key and the character keys and function keys allocated to the ten-key to be switched by simple operations.

Also specifically, the above object of this invention is to make it possible for the selection of a desired data item name and the setting of a desired data value among various values contained in said desired data item name to be achieved by simple operations.

Still also specifically, the above object of this invention is to make it possible for the selection of a desired data item name incorporated in a hierarchical structure and the setting of a desired data value among various values contained in said desired data item name to be achieved by simple operations.

Furthermore specifically, the above object of this invention is to make it possible for application software for recognizing letters or characters handwritten with a finger to be given a breakpoint between characters or a letters by simple operations.

Still furthermore specifically, the above object of this invention is to make it possible for the selection of a desired function to be achieved by way of finger touching.

Moreover specifically, the above object of this invention is to make it possible for the selection of a desired function to be achieved according to the touching portion of a finger and also make it possible for the control of said desired function selected to be controlled according to the touching portion of a finger.

Methods for Solve the Problems (1) A mobile digital device according to this invention has a ten-key pad being comprised of a key mat on which ten-key buttons with respective projections on the under surfaces thereof are laid out and a board on which respective contacts corresponding to the projections are laid out, and an electrostatic capacity sensing pad having through holes to be inserted the projections corresponding thereto and being provided with between the key mat and the board both as operation-input means.

IN other words, a mobile digital device according to this invention comprises a ten-key pad composed of a key mat on which ten-key buttons with respective projections on the under surfaces thereof are laid out and a key PCB (Printed Circuit Board) on which respective contacts corresponding to said projections are laid out on the top surface thereof and an electrostatic capacity sensing pad having through holes for use in insertion of corresponding projections and provided between said key mat and said key PCB both as operation-input means.

Owing to such construction, the mobile digital device according to this invention, even though the area of the operation-input part thereof is narrow like the mobile wireless telephones, etc., can be operation-input various functions.

When an operator presses any one ten-key button, the projection laid out on the back side thereof hits the corresponding contact laid out on the board. This makes the operator feel a click upon pressing the ten-key button as if he/she were pressing an ordinary ten-key button. In order to obtain this effect, said projections and contacts should preferably be made of hard material.

Here, instead of the electrostatic capacity sensing pad, an impedance sensing pad well known to the public, such as a pad detecting resistance change, may be used as appropriate.

(2) A mobile digital device according to this invention comprises a ten-key pad being comprised of a key mat on which ten-key buttons with respective projections on the under surfaces thereof are laid out and a key circuit board on which respective contacts corresponding to the projections are laid out, an electrostatic capacity sensing pad for sensing an electrostatic capacity change to detect a touched region and having through holes to be inserted the projections corresponding thereto and being provided with between the key mat and the key circuit board, a memory for keeping predetermined item names as table elements corresponded to respective small regions provided within a pad region of the electrostatic capacity sensing pad, an item name selector for selecting an item name corresponded to a small region in which a representative point of the touched region is situated, and a data value determiner for determining a data value of the selected item name according to the size of the touched region.

In other words, a mobile digital device according to this invention comprises a ten-key pad composed of a key mat on which ten-key buttons with respective projections on the under surfaces thereof are laid out and a key PCB (Printed Circuit Board) on which respective contacts corresponding to said projections are laid out on the top surface thereof, an electrostatic capacity sensing pad having through holes for use in insertion of corresponding projections and provided between said key mat and said key PCB, an item memory having a table of predetermined item names corresponded to respective small regions provided within a pad region of said electrostatic capacity sensing pad, an item name getter for obtaining an item name corresponded to a small region to which a representative point of a detected region in which electrostatic capacitance change is detected, and a data value determiner for determining a data value of the obtained item name according to the area of the detected region.

Owing to such constructions, the selection of a desired data item name and the setting of a desired data value among various values contained in said desired data item name can be achieved by simple operations.

Here, the term "representative point" refers, for example, to a barycentric coordinate (a center point of gravity) of the detected region, i.e., a coordinate point that represents a position of the detected region. Instead of a barycentric coordinate (a center point of gravity), any other representative points may be employed as representative point.

As examples of the item names, the functions of the ten-key buttons (functions of numeric keys, character keys, function keys and the like) may be exemplified. This refers, for example, to a case where electrostatic capacitance change requires a small area, i.e., a ten-key button is touched with the end of a fingertip, this key is made function as a numeric key, where electrostatic capacitance change requires a medium area, i.e., a ten-key button is touched with the entirety of a fingertip, this key is made function as a character key, and where electrostatic capacitance change requires a large area, i.e., a ten-key button is touched with the pad of a finger as well as fingertip, this key is made function as a function key. The small region may be set in a position outside the ten-key buttons or in the same position as the ten-key buttons. In the former case, the key type is set in the first place, and then each key of the ten-key is operated, and in the latter case, each time each key of the ten-key is operated, the type of said key of the ten-key is set. The item names further include, in addition to the above, line thickness, line color, line type, background, height in case of three-dimensional drawing, and select mode for, for example, telephone/e-mail/camera.

(3) A mobile digital device according to this invention comprises a ten-key pad being comprised of a key mat on which ten-key buttons with respective projections on the under surfaces thereof are laid out and a key circuit board on which respective contacts corresponding to the projections are laid out, an electrostatic capacity sensing pad for sensing an electrostatic capacity change to detect a touched region and having through holes to be inserted the projections corresponding thereto and being provided with between the key mat and the key circuit board, a memory controller for storing the touched region detected by the electrostatic capacity sensing pad in a memory, a locus generator for generating a locus from a set of representative points of each of the touched regions stored in the memory, and a breakpoint detector for detecting a breakpoint of the locus according to a feature of the touched region.

In other words, a mobile digital device according to this invention comprises a ten-key pad composed of a key mat on which ten-key buttons with respective projections on the under surfaces thereof are laid out and a key PCB (Printed Circuit Board) on which respective contacts corresponding to said projections are laid out on the top surface thereof, an electrostatic capacity sensing pad having through holes for use in insertion of corresponding projections and provided between said key mat and said key PCB, a path signal generator for generating a path signal time base traced by a set of representative points of detected regions in which electrostatic capacitance changes are detected respectively, and a breakpoint detector for detecting a breakpoint of said path signal based on features of the detected regions.

Owing to such construction, the breakpoints can be input easily in the handwritten locus. For example, a breakpoint between characters can be provided with a simple operation to application software for recognizing handwritten characters.

The path signal to be generated from a set of representative points of detected regions is a signal corresponding to a locus drawn by an operator on the electrostatic capacity sensing pad.

The features of the detected region in which electrostatic capacitance change is detected by the electrostatic capacity sensing pad are, for example, the area or size of the detected region, the contact direction of the detected region, and the number of the detected regions.

The technology for recognizing characters based on the coordinates stored as handwritten traces has been disclosed in, for example, "Computerized Recognition of Handwritten Characters (http://www.nemoto.ecei.tohoku.ac.jp/~wai/manu/manu/.html)" and well known to the public.

(4) A mobile digital device according to this invention comprises a ten-key pad being comprised of a key mat on which ten-key buttons with respective projections on the under surfaces thereof are laid out and a key circuit board on which respective contacts corresponding to the projections are laid out, an electrostatic capacity sensing pad for sensing an electrostatic capacity change to detect a touched region and having through holes to be inserted the projections corresponding thereto and being provided with a portion having the through holes between the key mat and the key circuit board and with the other portion on a part of a chassis of the mobile digital device, a memory controller for storing the touched region detected by the electrostatic capacity sensing pad in a memory, a locus generator for generating a locus from a set of representative points of each of the touched regions stored in the memory, a direction determiner for determining a touch direction according to a figure of the touched region detected by the electrostatic capacity sensing pad, and a breakpoint detector for detecting a breakpoint of the locus according to the touch direction determined by the direction determiner.

In other words, a mobile digital device according to this invention comprises a ten-key pad composed of a key mat on which ten-key buttons with respective projections on the under surfaces thereof are laid out and a key PCB (Printed Circuit Board) on which respective contacts corresponding to said projections are laid out on the top surface thereof, an electrostatic capacity sensing pad having through holes for use in insertion of corresponding projections and provided with the portion having such through holes between said key mat and said key PCB and with the other portion at least on a part of a chassis of said mobile digital device, a path signal generator for generating a path signal time base traced by a set of representative points of detected regions in which electrostatic capacitance changes are detected respectively, a direction determiner for determining a contact direction based on the shape of a detected region in which electrostatic capacitance change is detected by said electrostatic capacity sensing pad, and a breakpoint detector for detecting a breakpoint of said path signal based on the contact direction determined by said direction determiner.

Owing to such construction, the breakpoint of the handwritten traces can be input in the touch direction in which said mobile digital device is touched. For example, the breakpoints of the handwritten traces can be input by a user in the direction in which he/she is holding said mobile digital device.

Now, "the method of determining the touch direction based on the shape of a region in which electrostatic capacitance change is detected" is described referring to FIG. 5. The lattice in FIG. 5(a) shows a first striped electrode group 31a of an electrostatic capacity sensing pad 30, and a second striped electrode group 32a of the electrostatic capacity sensing pad 30 arranged at right angles to said first electrode group 31a. The first electrode group 31a are formed on a first plate 31, and the second electrode group 32a are formed on a second plate 32 bonded integrally with the first plate 31.

When a finger F contacts the electrostatic capacity sensing pad 30 (or approaches within about 1 mm therefrom), the electrostatic capacitance between the first electrode group 31a and the second electrode group 32a changes in the neighborhood of said finger-contact portion, this electrostatic capacitance change is output as a signal, and thereby the contact of the finger F is detected.

When it is assumed as shown in FIG. 5(a) that the finger F comes to contact the electrostatic capacity sensing pad 30 in an oblique direction (about 130° in the X-Y coordinate system as shown therein), a portion that is within the pad region of the electrostatic capacity sensing pad 30 and in which electrostatic capacitance changes is a deformed elliptical region T framed with a broken line in FIG. 5(a). A major axis direction CL of this deformed elliptical region T is identical roughly to the direction in which the finger F is approaching, and a minor axis direction CS of this deformed elliptical region T is identical to the direction in which this minor axis intersects the major axis direction CL roughly at right angles. A barycentric position (a center point of gravity) G of the deformed elliptical region T is located in a portion near the tip of the finger F within the deformed elliptical region T (FIG. 5(b)).

From the above, it is understood that the touch direction of the finger F (i.e., the direction of a region in which electrostatic capacitance change is detected) can be detected by obtaining the shape of the detected region of electrostatic capacitance change due to the contact by the finger F (i.e., the region of the deformed elliptical region T) (on the side where the barycentric position (a center point of gravity) G exists) and the gradient of the finger F.

Alternatively, the direction of the finger F may be obtained by approximating the coordinates of each point within the above deformed elliptical region T to a straight line by the square error minimization method and based on the gradient of said straight line.

If the deformed elliptical region loses the elliptical shape thereof due to the precision of the electrostatic capacity sensing pad 30, noise or the like, it may be so arranged that the shape is made closer to be elliptical by using a general method used for pattern processing, such as the expansion and contraction of the region.

The electrostatic capacity sensing pad 30 may be shaped not only plain but also curved along the case unit surface or the like. The electrostatic capacity sensing pad 30 may also be shaped like a plate or like a film having flexibility.

(5) A mobile digital device according to this invention comprises a ten-key pad being comprised of a key mat on which ten-key buttons with respective projections on the under surfaces thereof are laid out and a key circuit board on which respective contacts corresponding to the projections are laid out, an electrostatic capacity sensing pad for sensing an electrostatic capacity change to detect a touched region and having through holes to be inserted the projections corresponding thereto and being provided with between the key mat and the key circuit board, and a controller for selecting a function corresponded to a feature of the touched region detected by the electrostatic capacity sensing pad and executing the selected function.

In other words, a mobile digital device according to this invention comprises a ten-key pad composed of a key mat on which ten-key buttons with respective projections on the under surfaces thereof are laid out and a key PCB (Printed Circuit Board) on which respective contacts corresponding to said projections are laid out on the top surface thereof, an electrostatic capacity sensing pad having through holes for use in insertion of corresponding projections and provided between said key mat and said key PCB, and a controller for selecting a function corresponding to a feature of a detected region in which electric capacitance change is detected by said electrostatic capacity sensing pad and executing the selected function.

Owing to such construction, a desired function can be selected by way of finger touching to said mobile digital device. For example, it may be so arranged that a desired function can be selected according to the area of the touched region, the direction of the touched region, and the number of the touched regions.

For example, mode changeover can be made distinctively according to the touching portion of a finger as normal telephone mode when touched with the end of a fingertip, mail preparation mode when touched with the entirety of an entire fingertip, and camera mode when touched with the pad of a finger. In game software or the like, it may be so arranged that, for example, the input of an area corresponding to the end of a fingertip is set as rightward movement, the input of an area corresponding to the entirety of a finger is et as leftward movement, or the like.

(6) A mobile digital device according to this invention comprises a ten-key pad being comprised of a key mat on which ten-key buttons with respective projections on the under surfaces thereof are laid out and a key circuit board on which respective contacts corresponding to the projections are laid out, an electrostatic capacity sensing pad for sensing an electrostatic capacity change to detect a touched region and having through holes to be inserted the projections corresponding thereto and being provided with between the key mat and the key circuit board, a memory for keeping predetermined functions corresponded to respective small regions provided within a pad region of the electrostatic capacity sensing pad, a function selector for selecting a function corresponded to a small region in which a representative point of the touched region is situated, and a function controller for controlling the selected function according to a feature of the touched region detected by the electrostatic capacity sensing pad.

In other words, a mobile digital device according to this invention comprises a ten-key pad composed of a key mat on which ten-key buttons with respective projections on the under surfaces thereof are laid out and a key PCB (Printed Circuit Board) on which respective contacts corresponding to said projections are laid out on the top surface thereof, an electrostatic capacity sensing pad having through holes for use in insertion of corresponding projections and provided between said key mat and said key PCB, a function memory having a table of predetermined functions corresponded to respective small regions provided compartmentally within a pad region of said electrostatic capacity sensing pad, a function selector for selecting a function corresponded to a small region to which a representative point of a detected region in which electrostatic capacitance change is detected, and a control signal generator generating a control signal for controlling the selected function based on a feature of the detected region.

Owing to such construction, a desired function determined according to the touching portion of said mobile digital device can be selected and, at the same time, said selected function can be controlled according to how said portion is touched. That is, said selected function can be controlled according to the touched area, the touched direction or the number of the touched regions.

BEST MODE FOR CARRYING OUT THE INVENTION

Figure 1:
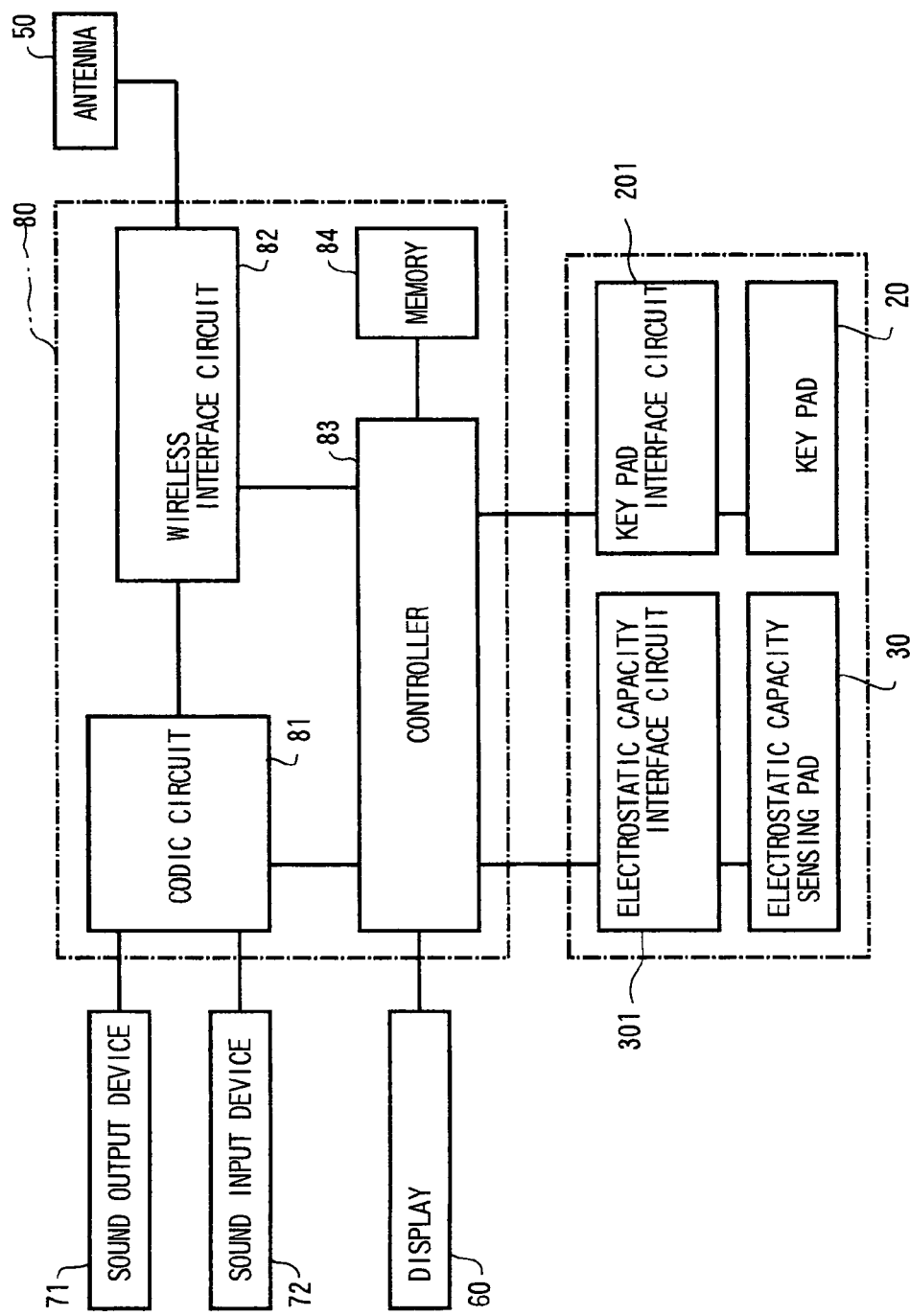
FIG. 1 is a block diagram showing the construction of an embodiment of a mobile wireless telephone according to this invention.

Hereinafter, by referring to the drawings, an embodiment of the mobile digital device according to this invention as a mobile wireless telephone is described.

FIG. 1 is a block diagram showing the construction of a mobile wireless telephone according to the embodiment. FIG. 2(a) is an exploded view schematically illustrating a ten-key pad 20 (21, 22) and an electrostatic capacity sensing pad 30 of said mobile wireless telephone, and FIG. 2(b) is a cross-sectional view of FIG. 2(a) viewed in a direction B. FIG. 3(a) is a front developmental view of said mobile wireless telephone, and FIG. 3(b) is a descriptive view of a liquid crystal panel 60 of said mobile wireless telephone. FIG. 4 is an exploded perspective view schematically showing a construction example of the ten-key pad and the electrostatic capacity sensing pad.

(1) Configuration of the Mobile Telephone

A mobile wireless telephone shown in FIGS. 1 to 4 has a liquid crystal display (LCD) panel 60, a ten-key pad 20 (a key mat 21 and a key PCB 22), an electrostatic capacity sensing pad 30, a speaker 71, a microphone 72 and others. The description of other components well known to the public and composing the mobile wireless telephone is omitted since these components do not relate directly to the substance of this invention.

Figure 2:
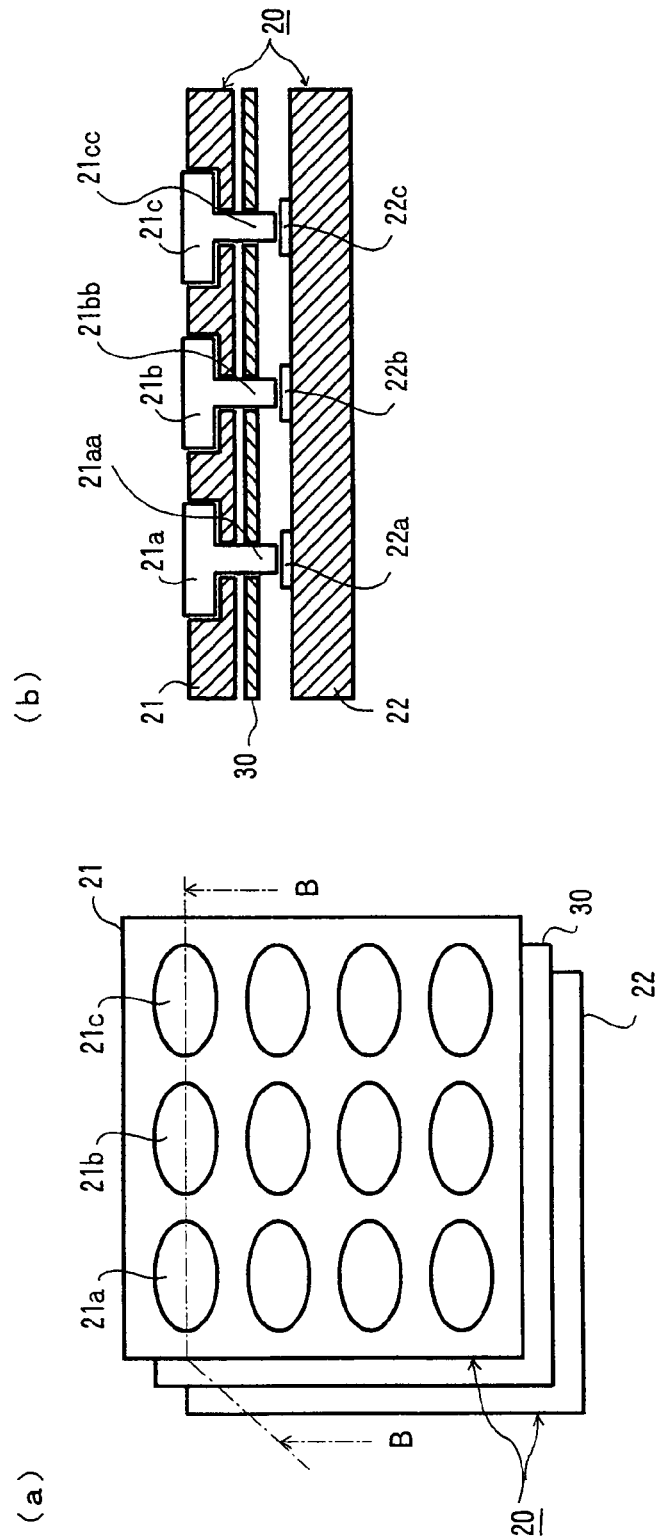
FIG. 2(a) is an exploded view schematically illustrating the layout relationship between a ten-key pad 20 (21, 22) and electrostatic capacity sensing pad 30 of said mobile wireless telephone.
FIG. 2(b) is a cross-sectional view of FIG. 2(a) viewed in a direction B shown with a chain line with one dot with an arrow.

The ten-key pad 20 comprises, as shown in FIG. 2, a key mat 21 on which a plurality of ten-key buttons 21a, 21b, 21c, . . . are laid out, and a key PCB 22 provided as an under layer of said key mat 21. Said ten-key buttons 21a, 21b, 21c, . . . are provided with projections 21aa, 21bb, 21cc, . . . , respectively, on the back side (on the under surface side) thereof. As if corresponded with said projections 21aa, 21bb, 21cc, . . . , the key PCB 22 is provided with contacts 22a, 22b, 22c, . . . , respectively. Owing to this arrangement, when any one of the ten-key buttons is pressed by a user, the projection on the back side of said ten-key button contacts the corresponding contact on the key PCB 22, and a signal indicating such contacting is output to a key-pad interface 201 (See FIG. 4). At the same time, when the ten-key button is pressed by the user, it is responded with a sense of resistance (i.e., a sense of click) to the user. In order for this sense of click to be felt favorably, it is preferable that the projections and/or contacts should be made of hard material. According to an example shown in FIG. 2, the ten-key buttons are formed separately from the key mat, but the ten-key buttons may be constructed integrally with the key mat by way of printing or the like. In such case, the projections are provided on the back side of the key mat.

Between the key mat 21 and the key PCB 22 are provided an electrostatic capacity sensing pad 30 having through holes in correspondence respectively with said projections. The electrostatic capacity sensing pad 30 has, as shown in FIG. 4, a first pad 31 and a second pad 32 adhered integrally with each other via an adherence layer 12. These two pads 31 and 32 are formed with striped electrodes (e.g., ITO electrodes), respectively, and arranged so that these striped electrodes can be positioned at right angles to each other (as if forming a grid). When a portion of a human body, such as a fingertip, contacts (or approaches) any ten-key button on the key pad (or any part of the key mat surface), electrostatic capacitance between the electrode on the first pad 31 and the electrode on the second pad 32, both in the neighborhood of the contacted (or approached) portion, changes, and said change is output to an electrostatic capacitance interface 301, i.e., detected. It should be noted here that the illustrated configuration is an example of the electrostatic capacity sensing pad, and that any configuration of the electrostatic capacity sensing pad other than the above may be employed as appropriate, needless to say. Also, the electrostatic capacity sensing pad may be expanded to a portion away from the portion between the key mat 21 and the key PCB 22. Alternatively, it may also be so arranged that an electrostatic capacity sensing pad is provided between the key mat 21 and the key PCB 22 and another electrostatic capacity sensing pad is provided at a separate portion away from said portion, such as the side of the mobile wireless telephone as indicated with a broken line in FIG. 6(a).

(2) Circuitry of the Mobile Telephone

As shown in FIG. 1, a circuit of the mobile wireless telephone according to this invention has a codec circuit 81 that codes an electric signal (sound signal) input from the sound input device (microphone) 72 and sends the same to an wireless interface circuit 82 and decodes data (sound data, etc.; the description of the data other than the sound data is omitted here) input from the wireless interface circuit 82 into an electric signal (sound signal) and outputs the same to the sound output device (speaker) 71, the wireless interface circuit 82 that converts data input from the codec circuit 81 into an electric signal and outputs the same from an antenna 50 and converts an electric signal received by the antenna 50 into data (sound data, etc.; the description of the data other than the sound data is omitted here) and outputs the same to the codec circuit 81, a controller 83 that controls the operations of the codec circuit 81 and wireless interface circuit 82 or does the like for the operation of these circuits, and a memory 84 that is used by the controller 83, if necessary. These codec circuit 81, wireless interface circuit 82, controller 83 and memory 84 configure a mobile wireless telephone circuit 80 well known conventionally to the public.

The controller 83 is input with an electric signal (pressure detection signal) generated by pressing the keys 21a, 21b, 21c, . . . on the key pad 20 after conversion into data (pressure detection data) by a key pad interface circuit 201 in addition to the data from said codec circuit 81 and wireless interface circuit 82. Also, the controller 83 is input with the electrostatic capacity change detected by the electrostatic capacity sensing pad 30 according to the contact (or approach) by a human body after conversion into data by the electrostatic capacity sensing pad interface circuit 301.

(3) Small Regions and Data Items

Procedures for setting a desired data value to an data item in correspondence with a small region by contacting a finger to such small region among small regions 301, 302 and 303 provided compartmentally in the lower part of an electrostatic capacity sensing pad region (shaded area framed with a broken line shown in FIGS. 3(a) and 3(b)) are described.

Figure 3:
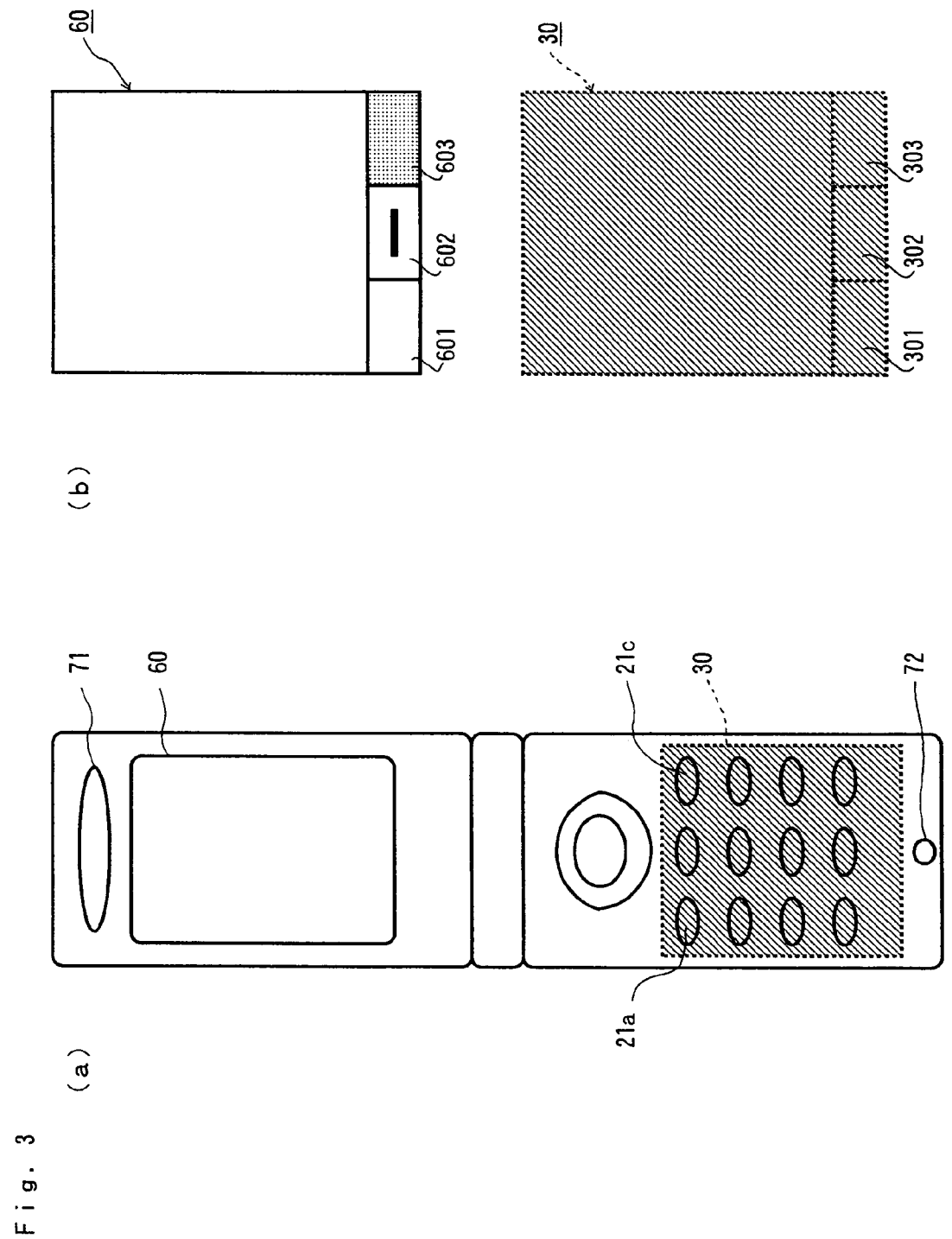
FIG. 3(a) is a front developmental view of said mobile wireless telephone.
FIG. 3(b) is a descriptive view of corresponding relationship between a display region of a liquid crystal panel 60 and small regions provided compartmentally within a pad region of an electrostatic capacity sensing pad 30 of said mobile wireless telephone.
Figure 4:
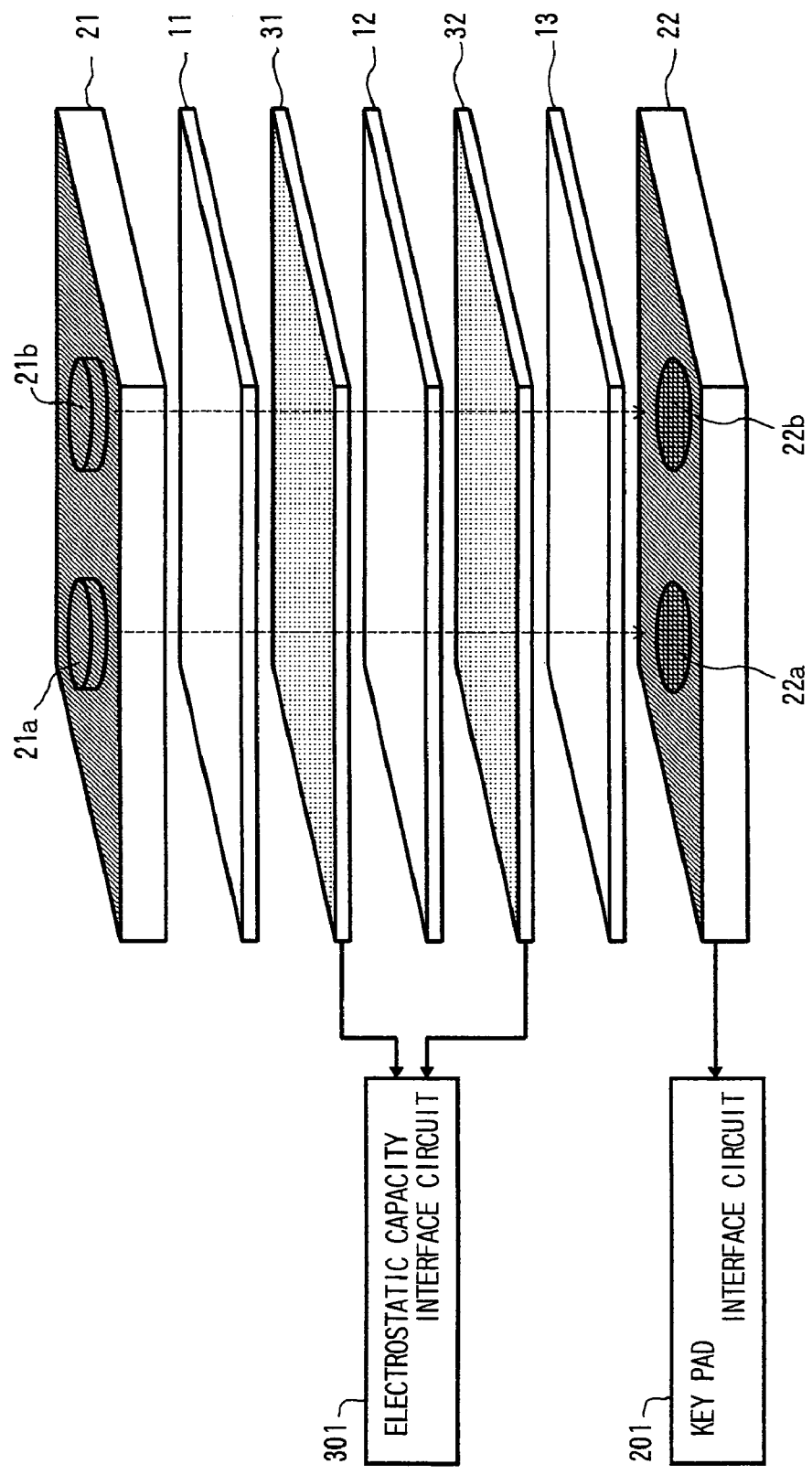
FIG. 4 is an exploded perspective view schematically showing a construction example of the ten-key pad and the electrostatic capacity sensing pad.

According to an example shown in FIG. 3, the small region 301 is a region for selecting background, the small region 302 is a region for selecting line thickness, and the small region 303 is a region for selecting line color.

For example, when the small region 302 is touched with the end of a fingertip, since the area of the detection region is "small," "thin line" is selected, and said selected thin line is displayed in a corresponding display area 602 within an LCD panel 60. Likewise, when the small region 302 is touched with the entirety of a fingertip, since the area of the detection region is "medium," "medium line" is selected, and said selected medium line is displayed in a corresponding display area 602 within an LCD panel 60. Also, likewise, when the small region 302 is touched with the pad of a finger, since the area of the detection region is "large," "thick line" is selected, and said selected thick line is displayed in a corresponding display area 602 within an LCD panel 60.

On the other hand, when the small region 303 is touched with the end of a fingertip, since the area of the detection region is "small," "warm color family" is selected as line color type, and a warm color is available for selection. Furthermore, in this warm color family selected state, when the small region 303 is touched with the end of a fingertip, since the area of the detection region is "small," "red" among of all colors of the warm color family is selected as line color, and a line in said selected color is displayed in a corresponding display area 603 within an LCD panel 60. Likewise, in the warm color family selected state, when the small region 303 is touched with the entirety of a fingertip or the pad of a finger, another "color" of the warm color family is available for selection. Also, likewise, after "cold color family" is selected by touching the small region 303 with the entirety of a fingertip in the color family unselected state, a desired cold color can be set and displayed by touching the small region 303 with the end of a fingertip, the entirety of a fingertip or the pad of a finger in said cold color family selected state.

The small region 301 is a region for selecting background, and selected background is displayed in the whole area of the LCD panel 60.

According to the above example, the data item names corresponded to the small regions are line thickness, line color and background. However, it may also be so arranged that any data item names and data values other than these can be selected or set. As other data item names that can be corresponded to the small regions, three-dimensional drawing height and selected mode for telephone/e-mail/camera can be exemplified.

Furthermore, it may also be so arranged that the selection and setting of data item names and/or data values can be achieved by tracking back a hierarchical structure as referred to in the description of the selection of color type and color. For example, it may be so arranged that a small region is corresponded to a data item name of "line," and when said region is touched with the end of a fingertip, said region is switched to a region for a data item name of "line thickness," when said region is touched with the entirety of a fingertip, said region is switched to a region for a data item name of "line type," and when said region is touched with the pad of a finger, said region is switched to a region for a data item name of "line color." In this case, it is assumed that any of the data values of "thin line, medium line or thick line" can be selected and set in the "line thickness" item name, any of the data values of "broken line, full line, chain line with one dot or the like" can be selected and set in the "line type" item name, and any of the data values of "red, blue, green or the like" can be selected and set in the "line color" item name. It goes without saying that the data values can also employ a hierarchical structure in the same way.

According to the above example, the small regions for selecting a desired data item name and data value by touching are provided in the lower part within the electrostatic capacity sensing pad region. However, without being limited to the lower part, it may also be so arranged that such small regions are provided in any other part within the electrostatic capacity sensing pad region.

Also, according to the above example, a desired data item name is selected prior to the input of a trace (line) and then a desired data value (thickness, color) is set in said selected data item. However, without being limited to this sequence, it may also be so arranged that a desired data item name is selected at any time and a desired data value is set to said selected desired data item name. For example, each ten-key is set with a small region, and function allocated to said ten-key can be switched to another function according to the area of a region touched on the ten-key. For example, it may be so arranged that when the ten-key is touched with the end of a fingertip, input is set to ordinary numeric value as allocated to said ten-key, when the ten-key is touched with the entirety of a fingertip, input is set to one of 12 alphabets from the first alphabet to the 12th alphabet (when 12 ten-keys are available) as allocated to said ten-key, and when the ten-key is touched with the pad of a finger, input is set to one of 12 alphabets from the 13th alphabet to the 24th alphabet as allocated to said ten-key.

(4) Procedures for Conversion into Characters

In this section, procedures for detecting a breakpoint of a trace input with a finger to convert the trace to a letter or a character will be described.

(4-1) Example of Detecting a Breakpoint Based on the Area

Figure 7:
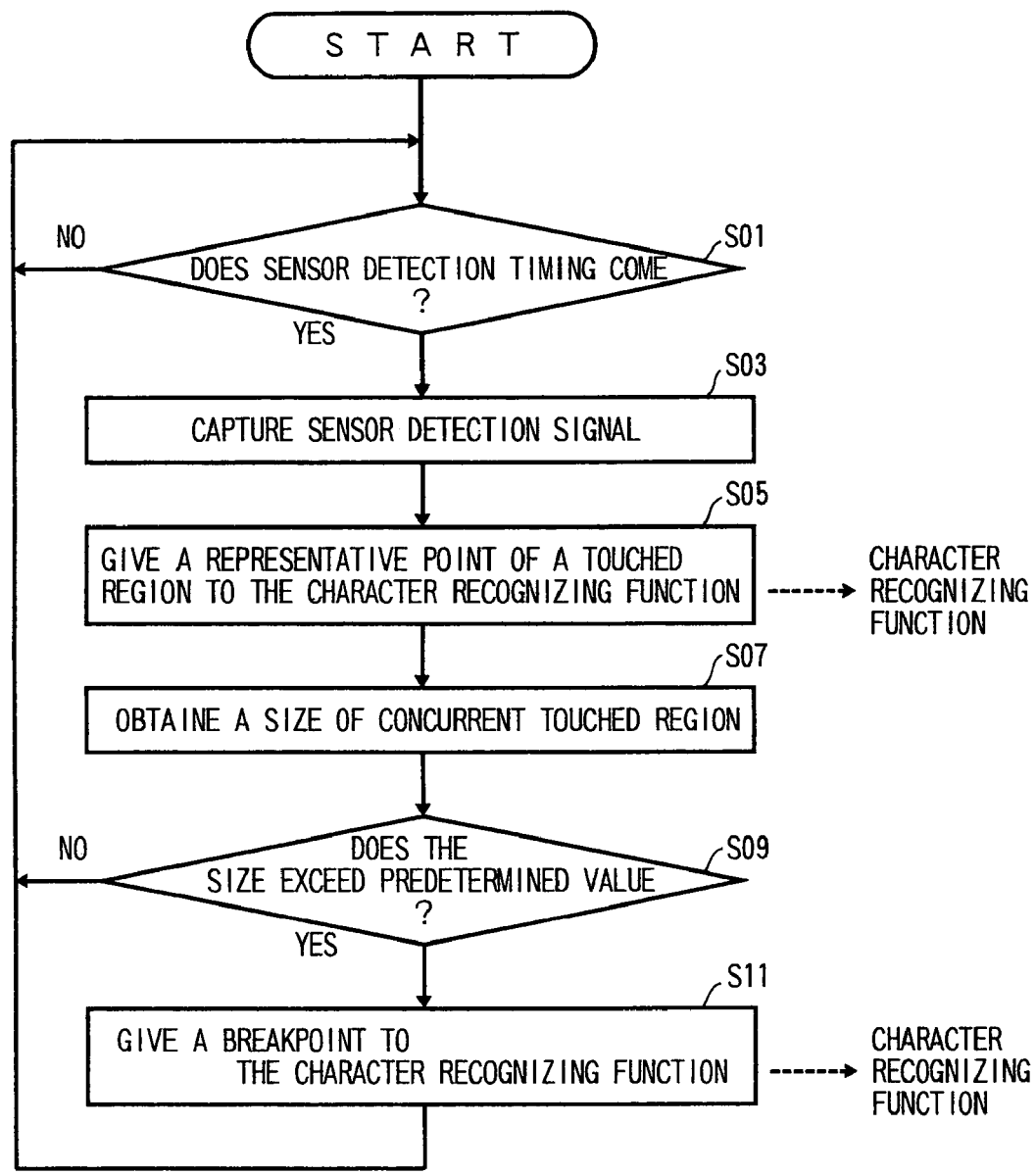
FIG. 7 is a flow chart showing a procedure for detecting a breakpoint between handwritten characters according to an area of a region in which electric capacitance change is detected.

FIG. 7 shows a procedure for detecting a breakpoint (the start of the next character) and notifying it to a character recognizing function when the contact area of a finger drawing a character on the electrostatic capacity sensing pad 30 changes. Here, the character recognizing function is realized by the execution of application software for character recognition well known to the public by the controller 83. Since the character recognizing function itself is well known, the description thereof is omitted here.

Firstly, when sensor signal detecting timing comes (YES to S01), output signal from the electrostatic capacity sensing pad 30 is captured (S03). On the other hand, the position of the detection region detected this time, i.e., the barycentric position, which is the representative coordinates of the detection region, is given to the character recognizing function (S05). Thereby, the character recognizing function stores the position of the detection region detected this time in the memory on the position group of the detection regions detected previously.

Next, the area of the detection region detected this time is obtained, and compared with a given threshold (S07). That is, whether the number of dots representing the electrostatic capacitance change detected this time is the number of dots equivalent to the end of a fingertip (i.e., small area) or the entirety of a fingertip (i.e., medium area) or the pad of a finger (i.e., large area) is checked.

When the detected area is found to be the number of dots equivalent to the end of a fingertip or the entirety of a fingertip (NO to S09), the process return to the step S01, i.e., the input of the representative coordinate position (trace) of the detecting area is continued.

On the other hand, when the detected area is found to be the number of dots equivalent to the pad of a finger as a result the check in the step S09 (YES to S09), since it means a breakpoint, the effect that the next character should be started is notified to the character recognizing function (S11).

(4-2) Example of Detecting a Breakpoint Based on the Direction

Figure 8:
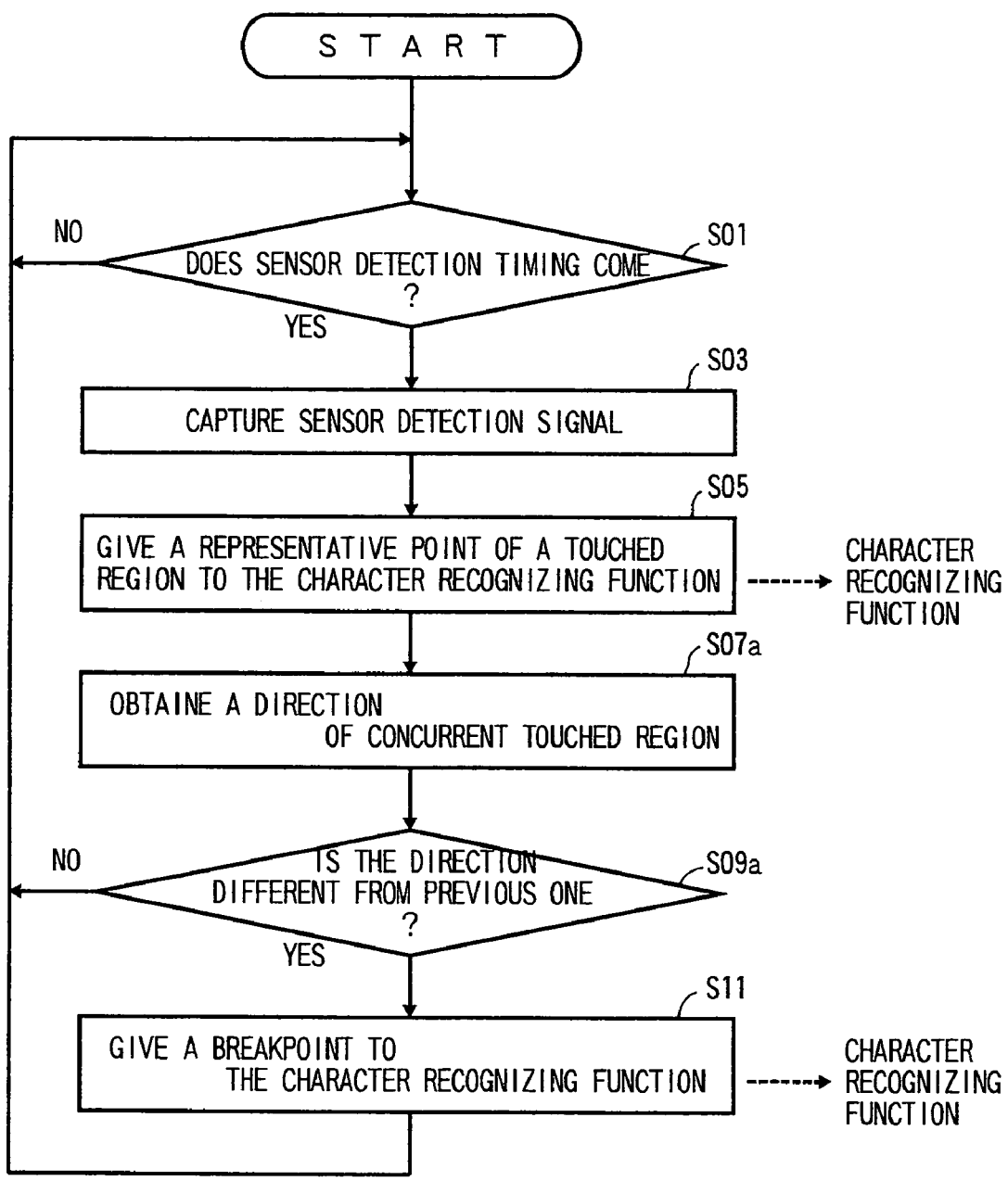
FIG. 8 is a flow chart showing a procedure for detecting a breakpoint between handwritten characters according to the touch direction of a region in which electric capacitance change is detected.

FIG. 8 shows a procedure for notifying a character recognizing function to the effect that it is a breakpoint (the start of the next character) when a contact direction of a finger drawing a character on the electrostatic capacity sensing pad 30 changes. When the process in this figure is identical to that of FIG. 7, the same step No. is affixed to such process.

Firstly, when sensor signal detecting timing comes (YES to S01), output signal from the electrostatic capacity sensing pad 30 is captured (S03). On the other hand, the position of the detection region detected this time, i.e., the barycentric position, which is the representative coordinates of the detection region, is given to the character recognizing function (S05). Thereby, the character recognizing function stores the position of the detection region detected this time in the memory on the position group of the detection regions detected previously.

Figure 5:
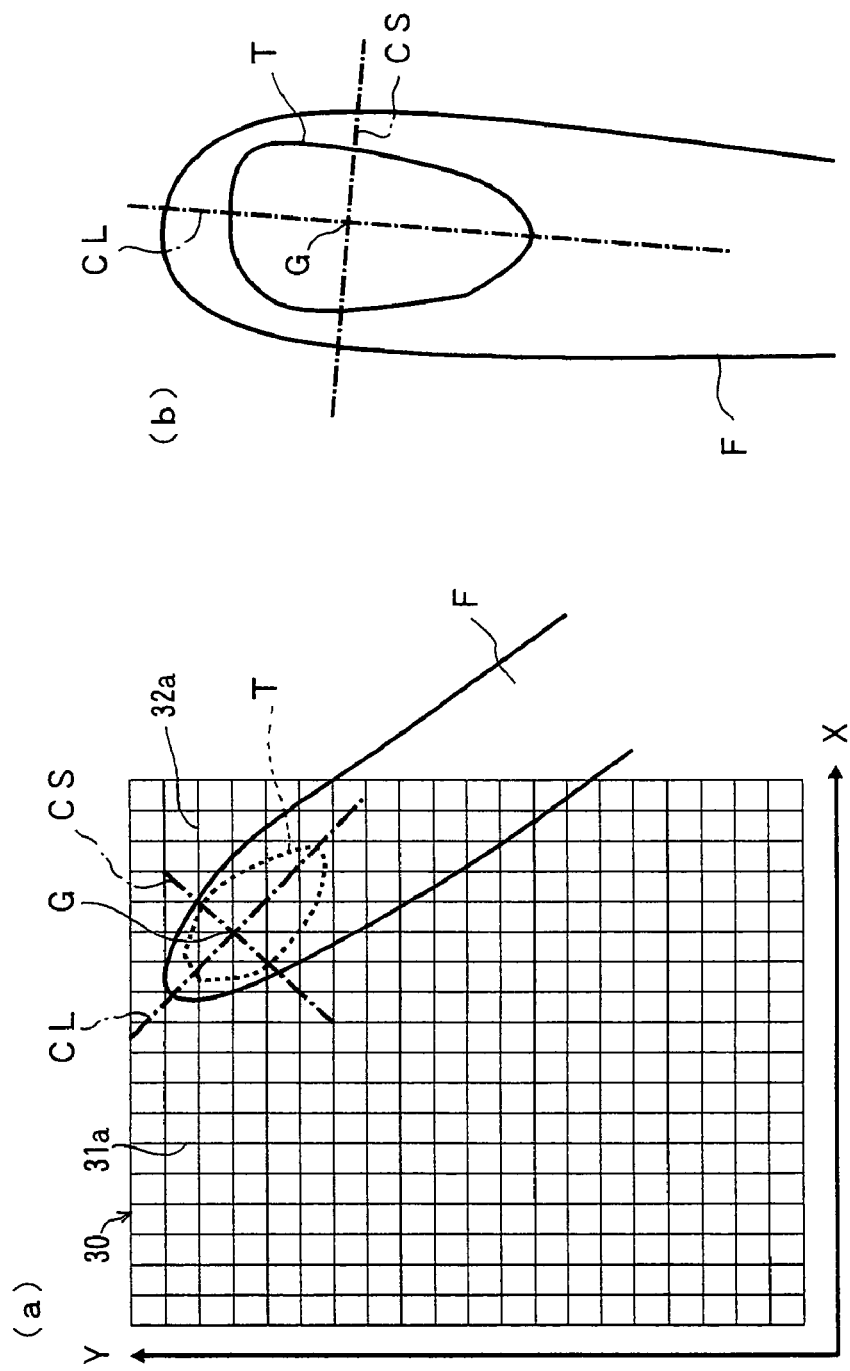
FIG. 5 is a descriptive view showing a method of determining the touch direction of a region in which electric capacitance change is detected according to the shape of said region.

Next, the direction of the detecting area is obtained (S07a). The method applied to this step has already been detailed herein by referring to FIG. 5, the description thereof is omitted here.

Then, whether the direction obtained in the step S07a is different or not from the direction detected previously is checked (S09a). Here, errors are allowed to a certain degree as a matter of course. For example, detected directions are determined to have the same identity if they are within a range of 0-45°, 45-90°, 90-135° or 135-180°.

As a result of checking in the step S09a, if the direction of the region detected (the region in which electrostatic capacitance change is detected) this time is the same as that of the previous time (NO to S09a), the process returns to the step S01, i.e., the input of the representative coordinate position (trace) of the detection region is continued.

On the other hand, as a result of checking in the step S09a, if the direction of the region detected (the region in which electrostatic capacitance change is detected) this time is different from that of the previous time (YES to S09a), it means a breakpoint, and notification to the effect that the next character should be started is given to the character recognizing function (S11).

(4-3) Example of Detecting a Breakpoint Based on the Number of Regions

Figure 9:
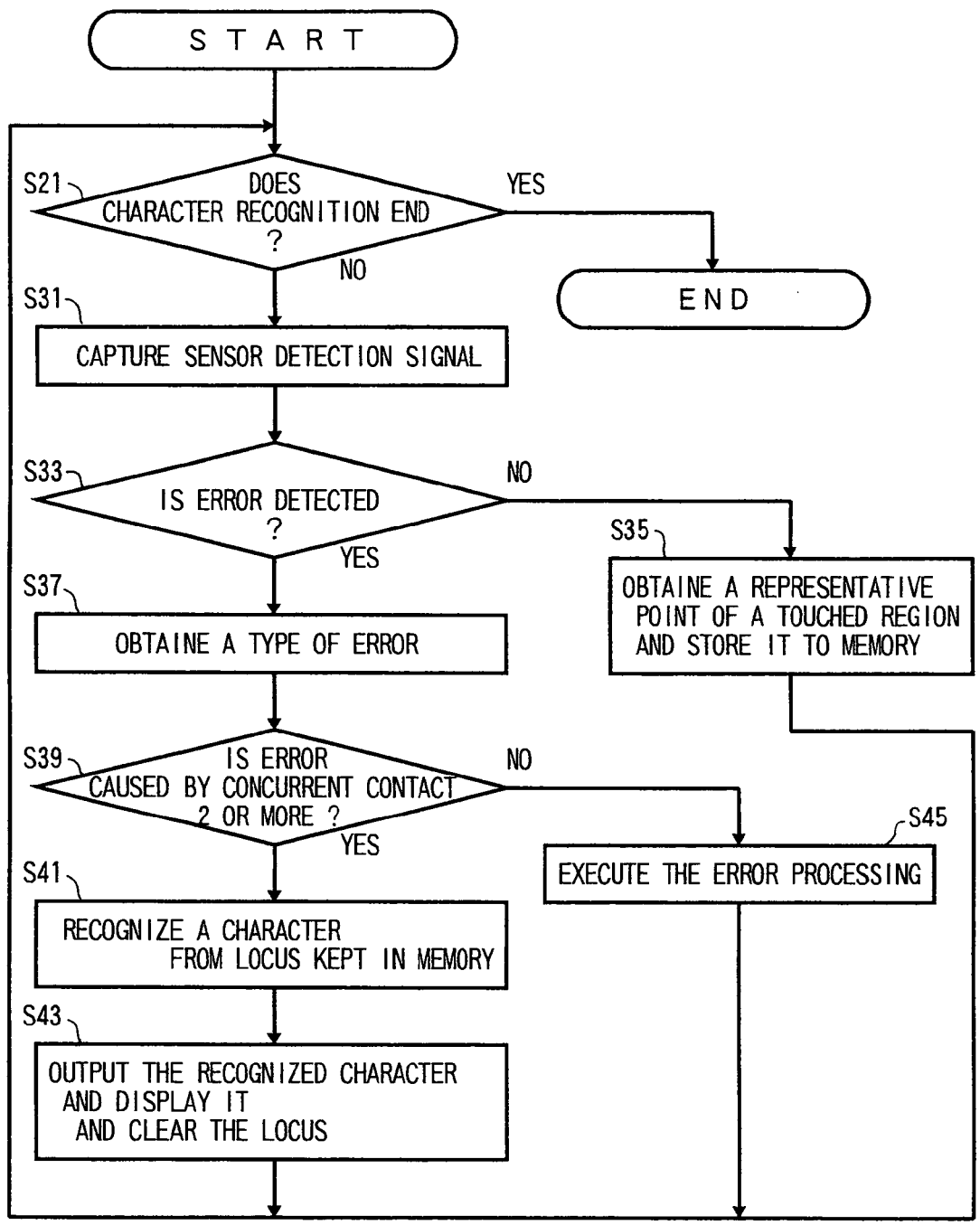
FIG. 9 is a flow chart showing a procedure for detecting a breakpoint between handwritten characters according to the number of regions in which electric capacitance change is detected.

When the number of regions of the electrostatic capacity sensing pad 30 that a finger touches during handwriting a character becomes plural, it is recognized as a breakpoint (the start of the next character), and character recognition is performed based on the trace until such number of regions becomes plural. FIG. 9 shows the procedure for the output or the like of such recognized character to the display or the like. That is, when a character is handwritten with one fingertip on the electrostatic capacity sensing pad 30, if the contact of the electrostatic capacity sensing pad 30 by two or more fingertips concurrently and such concurrent touching by a plurality of fingertips is detected by the electrostatic capacity sensing pad 30, this figure shows the procedure for processing such detection as a breakpoint.

Figure 6:
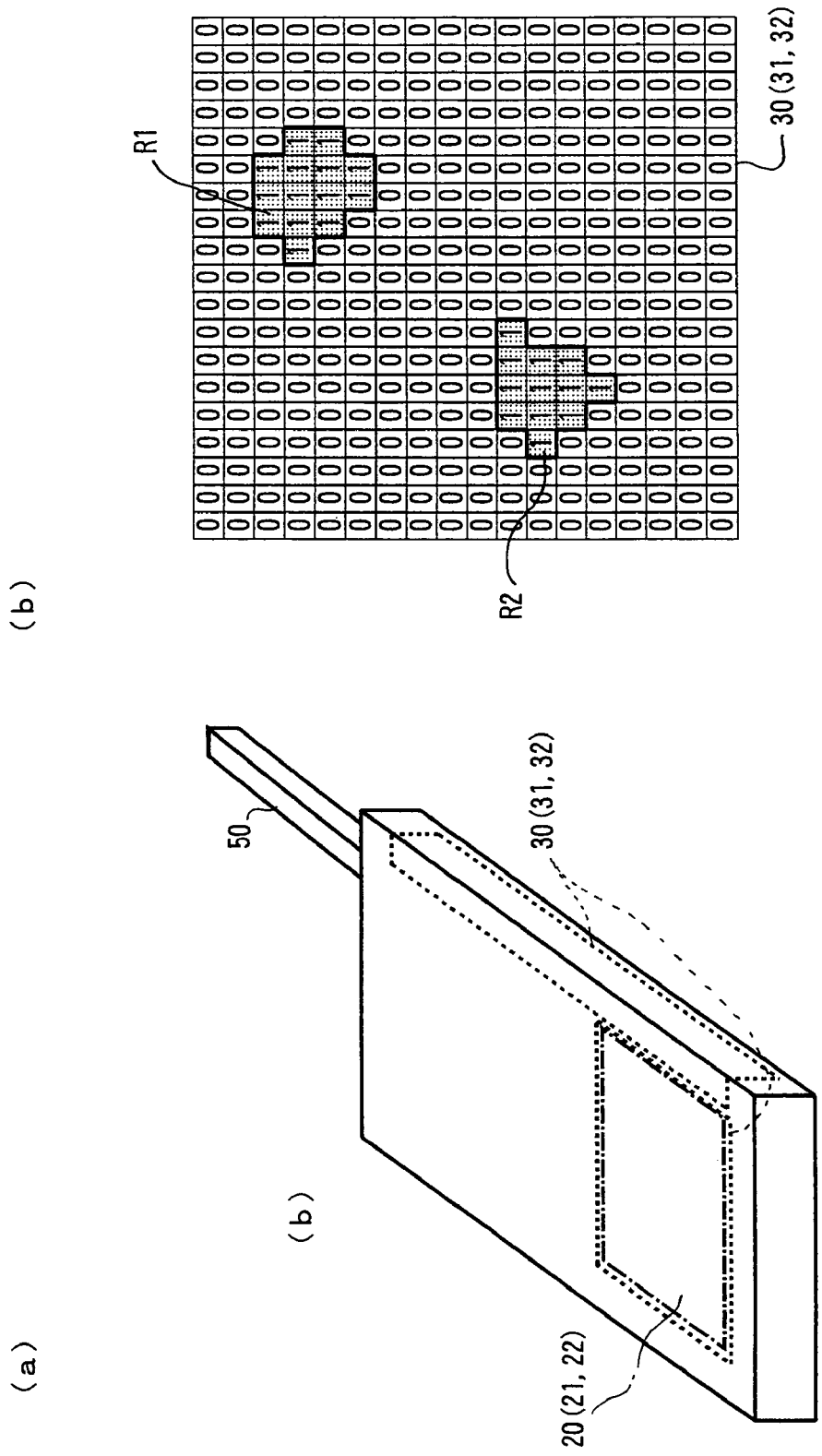
FIG. 6(a) is a descriptive view showing an example in which an electrostatic capacity sensing pad 30 (31, 32) is provided separately from a key pad 21 (22)
FIG. 6(b) is a descriptive view showing a region in which electrostatic capacitance change is detected.

Here, the regions to be checked as to the electrostatic capacitance change detection are regions exemplified in FIG. 6(b) as R1 and R2, i.e., regions composed of a plurality of dots continued two-dimensionally, and it is detected whether the number of such regions is one or two or more.

The electrostatic capacitance change in each dot is detected as described in the following examples:

Positions numbered as "1" or "0" in FIG. 6(b) indicate intersecting positions of a striped first electrode group 31a of the electrostatic capacity sensing pad 30 (See FIG. 5) and a striped second electrode group 32a of the electrostatic capacity sensing pad 30 (See FIG. 5) arranged at right angles to said first electrode group. It should be noted here that the first electrode group are formed on a first plate 31 and the second electrode group are formed on a second plate 32 adhered integrally with the first plate. When a fingertip contacts the electrostatic capacity sensing pad 30 (or approaches within about 1 mm therefrom), the electrostatic capacitance between the first electrodes and the second electrodes changes in the neighborhood of said contacted portion, and such change is output as a signal. In FIG. 6(b), portions output such signal are indicated as "1." In this way, the contact of a fingertip is detected.

Now, description is given to the detection procedures.

In the step S31, the detection signal from the electrostatic capacity sensing pad 30 is captured.

In the step S33, whether an error attributable to the capture of the detection signal from the electrostatic capacity sensing pad 30 is detected or not is checked. As a result, if said error is not detected (NO to S33), the coordinates of the barycentric position of the detecting area of the electrostatic capacity sensing pad 30 are obtained and stored in a specified area in the memory (S35).

On the other hand, if said error attributable to the capture of the detection signal from the electrostatic capacity sensing pad 30 is detected (YES to S33), the type of the error is captured (S37).

If the error obtained in the step S37 is an error caused by the concurrent contact of the electrostatic capacity sensing pad 30 by two or more fingertips (YES to S39), the character is recognized based on the coordinates of each barycentric position stored in a specified area in the memory (S41), i.e., based on the trace of the barycentric position (S41). The recognized character is output to the display or the memory or the like that stores the input characters, and clear the previously stored data (the trace of the barycentric position) (S43). This enables the input of the next character.

Then, the process returns to the step S01. The above procedure is executed repetitively until the application software for character recognizing process ends (while it remains NO to S21).

If the error obtained in the step S37 is an error other than the error caused by the concurrent contact of the electrostatic capacity sensing pad 30 by two or more fingertips (NO to S39), process applicable to said error is executed (S45).

(5) Procedures for Selecting the Process

Procedures for selecting the process based on the mode of contact by a fingertip and executing such process are described.

(5-1) Example of Selecting the Process Based on the Contact Area

Figure 10:
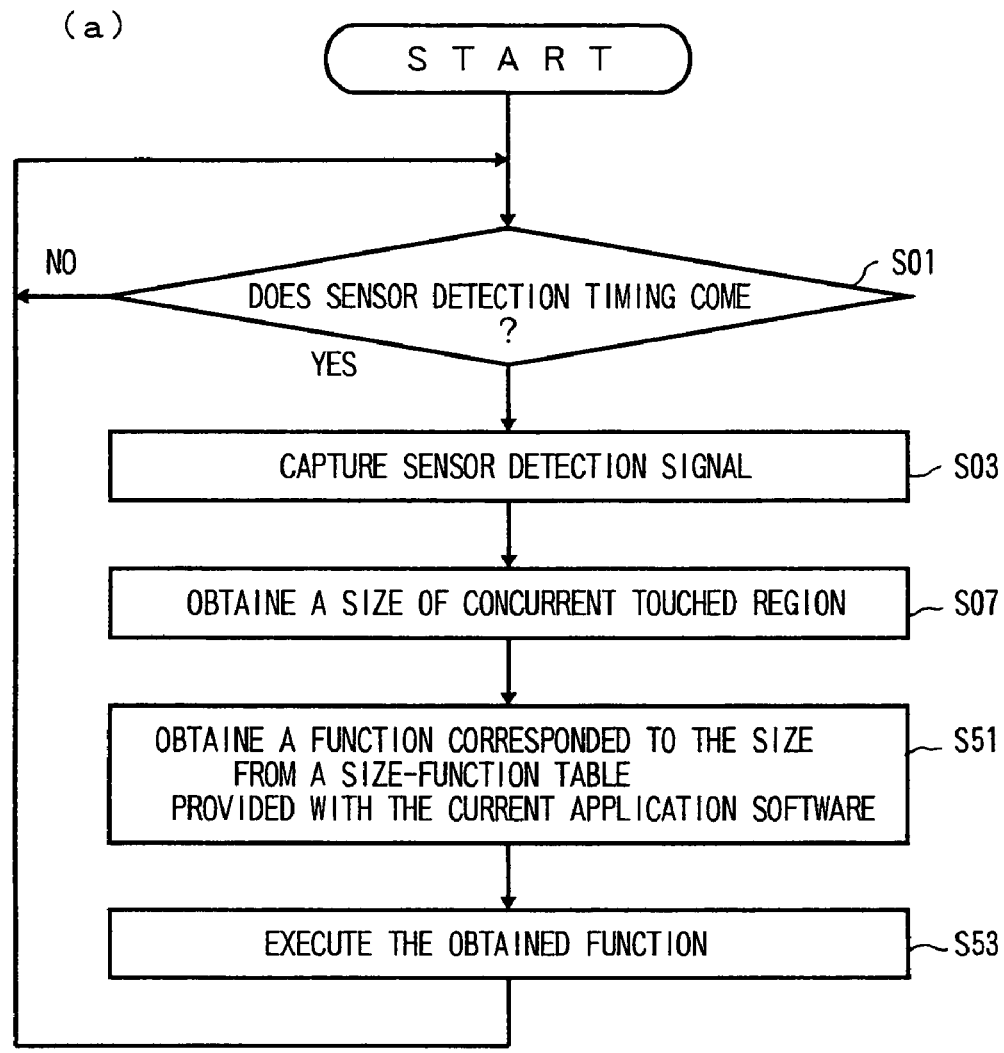
FIG. 10(a) is flow chart showing a procedure for selecting processing according to an area of a region in which electrostatic capacitance change is detected.
FIG. 10(b) is a descriptive view exemplifying an area-processing tale.

FIG. 10(a) shows procedures for selecting the process based on the area of the electrostatic capacity sensing pad 30 contacted by a fingertip and executing said process. When the process in this figure is identical to that of FIG. 7, the same step No. is affixed to such process.

The steps S01, S03 and S07 are the same as those of FIG. 7.

In the step S51, the process corresponding to the detected area obtained in the step S07 is obtained from "area-process table" (FIG. 10(b)) for the application software in current execution. The "area-process table" is equipped by the mobile wireless telephone according to the application software. According to an example specified in this figure, if the detected area (the number of dots) obtained in the step S07 is within a range "equivalent to contact by the end of a fingertip," for example, the process of "movement to lower left" is executed (S53).

(5-2) Example of Selecting the Process Based on the Contact Direction

Figure 11:
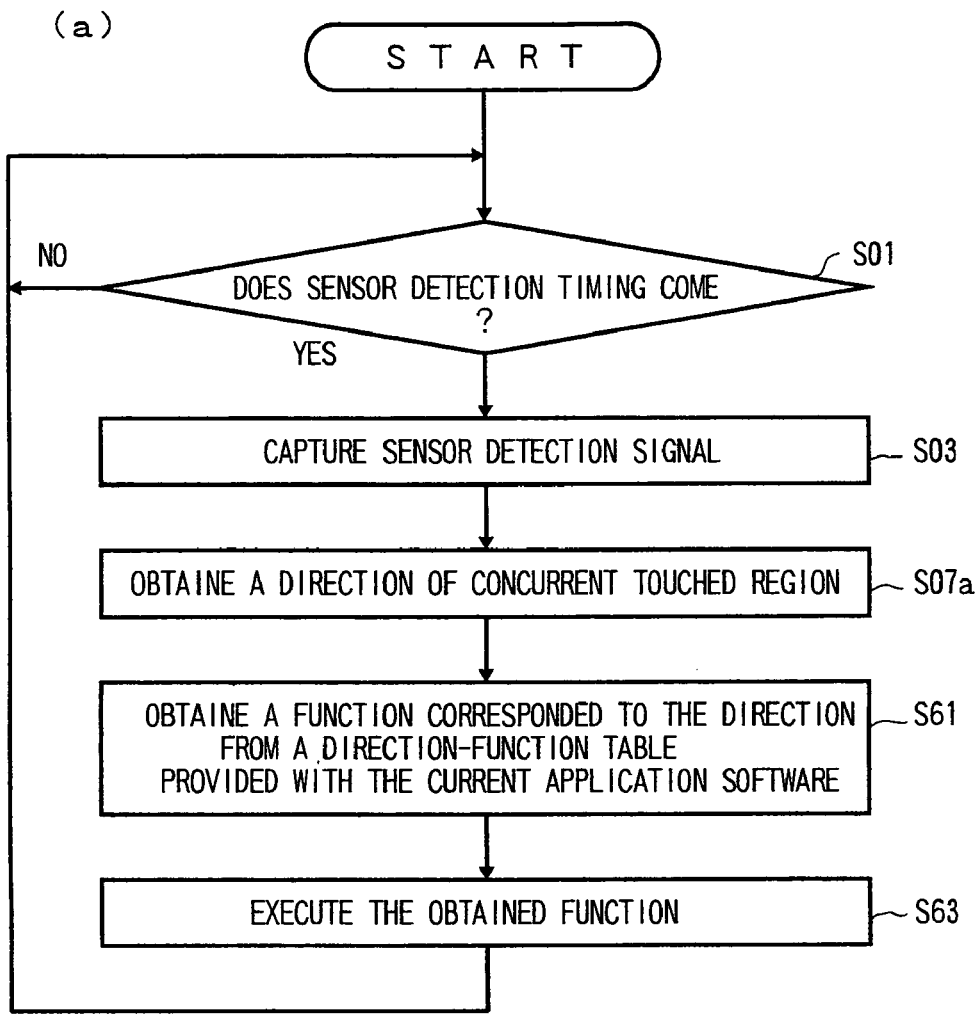
FIG. 11(a) is flow chart showing a procedure for selecting processing according to a touch direction of a region in which electrostatic capacitance change is detected.
FIG. 11(b) is a descriptive view exemplifying an direction-processing tale.

FIG. 11(a) shows procedures for selecting the process based on the contact direction on the electrostatic capacity sensing pad 30 in which contact is made by a fingertip and executing said process. When the process in this figure is identical to that of FIG. 8, the same step No. is affixed to such process and description is omitted.

The steps S01, S03 and S07a are the same as those of FIG. 8.

In the step S61, the process corresponding to the detected contact direction obtained in the step S07a is obtained from "direction-process table (FIG. 11(b)) for the application software in current execution. The "direction-process table" is equipped by the mobile wireless telephone according to the application software. According to an example specified in this figure, if the detected contact direction obtained in the step S07s is within a range "0-45°," the process of "movement to lower left" is executed (S63).

(5-3) Example of Selecting the Process Based on the Number of Regions

FIG. 12(a) shows procedures in application software other than that for character recognition (e.g., game) for processing the input by a single fingertip as an ordinary input of said application software and processing the input by a plurality of fingertips as a predetermined process.

In the step S81, detection signal is captured from the electrostatic capacity sensing pad 30.

In the step S83, whether an error attributable to the capture of the detection signal from the electrostatic capacity sensing pad 30 is detected or not is checked. As a result, if said error is not detected (NO to S83), the detection by the electrostatic capacity sensing pad 30 is processed as an ordinary input of the application software in current execution (S85).

On the other hand, if said error attributable to the capture of the detection signal from the electrostatic capacity sensing pad 30 is detected (YES to S83), the type of the error is obtained (S87).

Figure 12:
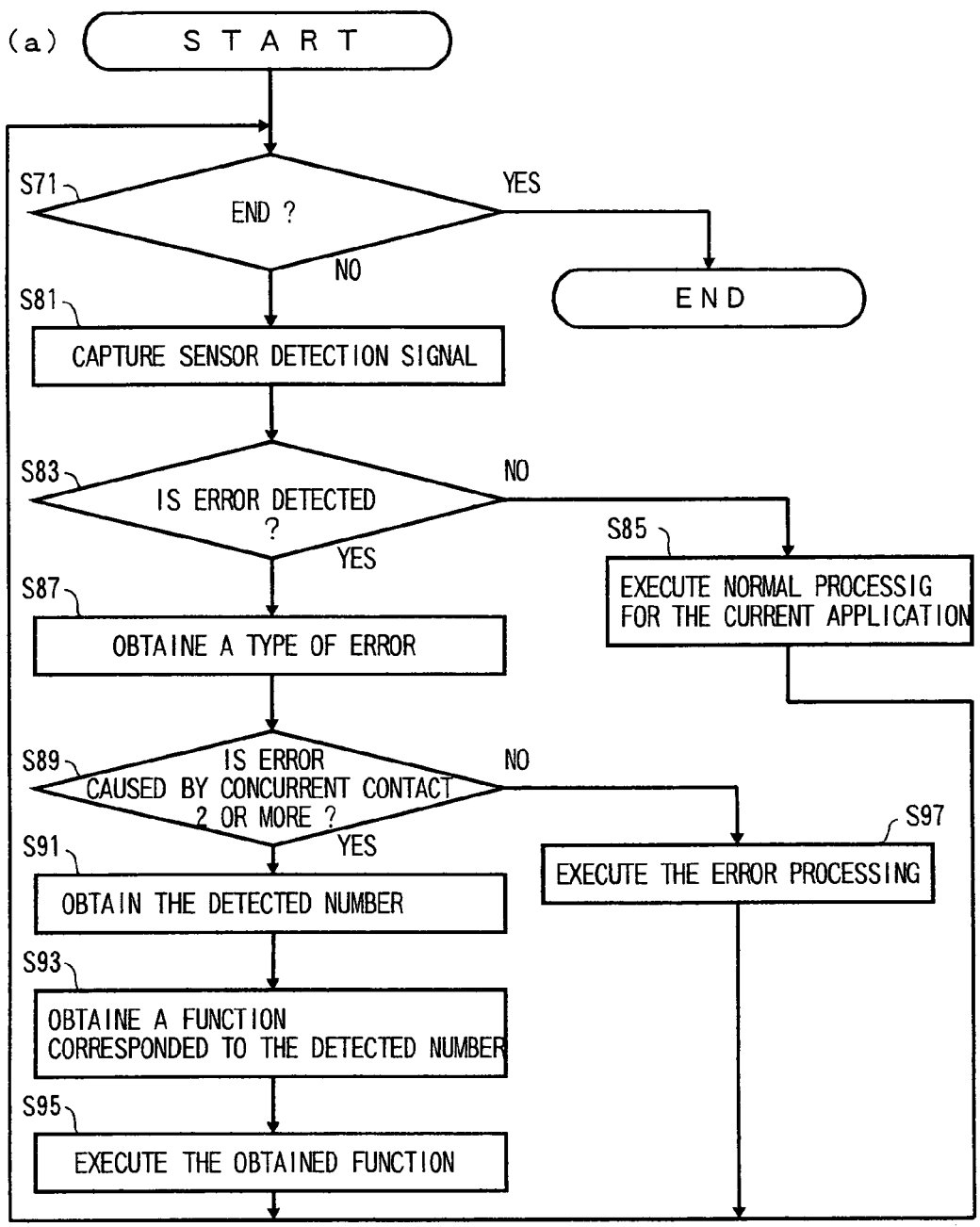
FIG. 12(a) is flow chart showing a procedure for selecting processing according to the number of regions in which electrostatic capacitance change is detected.
FIG. 12(b) is a descriptive view exemplifying a number of regions-processing tale.

If the error captured in the step S87 is an error caused by the concurrent contact of the electrostatic capacity sensing pad 30 by two or more fingertips (YES to S89), the number of regions detected by the electrostatic capacity sensing pad 30 is obtained (S91) and the process corresponding to the number of said obtained regions is obtained from the number of regions-processing table (FIG. 12 (b)) (S93) and said process is executed (S95). According to an example shown in this figure, when the number of detection regions is 2, for example, the process of "movement to upper left" is executed.

Then, the process returns to the step S71. The above procedure is executed repetitively until the application software for character recognizing process ends (while it remains NO to S71).

If the error obtained in the step S87 is an error other than one caused by the concurrent contact of the electrostatic capacity sensing pad 30 by two or more fingertips (NO to S89), process corresponding to said error is executed (S97).

The above-described embodiments are examples giving shape to this invention as a mobile wireless telephone. However, this invention is not limited to the mobile wireless telephone but can be applied in the same way to, for example, portable mobile digital devices, such as personal digital assistances (PDA) and notebook personal computers.

The invention claimed is:

1. A mobile digital device having an operating input unit, the input unit comprising:
    a ten-key pad being comprised of a key mat on which ten-key buttons with respective projections on the under surfaces thereof are laid out and a board on which respective contacts corresponding to the projections are laid out; and
    an electrostatic capacity sensing pad provided between the key mat and the board, the electrostatic capacity sensing pad having through holes corresponding to the respective projections and in which the projections corresponding to the through holes are inserted.

2. A mobile digital device according to claim 1, wherein the ten-key buttons are printed on the key mat.

3. A mobile digital device comprising:
a ten-key pad being comprised of a key mat on which ten-key buttons with respective projections on the under surfaces thereof are laid out and a key circuit board on which respective contacts corresponding to the projections are laid out;
an electrostatic capacity sensing pad for sensing an electrostatic capacity change to detect a touched region and having through holes to be inserted the projections corresponding thereto and being provided with between the key mat and the key circuit board;
a memory for storing predetermined item names as table elements corresponding to respective small regions provided within a pad region of the electrostatic capacity sensing pad;
an item name selector for selecting an item name corresponding to a small region in which a representative point of the touched region is situated; and
a data value determiner for determining a data value of the selected item name according to a size of the touched region.

4. A mobile digital device according to claim 3, further comprising:
a memory controller for storing the touched region detected by the electrostatic capacity sensing pad in a memory;
a locus generator for generating a locus from a set of representative points of the touched region; and
wherein the item names kept in the memory are background, line thickness, and line color.

5. A mobile digital device according to claim 3, further comprising:
a display panel; and
a display controller for generating displaying data from the selected item name and the determined data value to display a concrete symbol corresponded to the determined value in an area within the display panel assigned according to the selected item name.

6. A mobile digital device according to claim 5, wherein each of the item names kept in the memory has subdivision item names thereof and the data value determiner determines a data value by tracking the subdivision item names.

7. A mobile digital device comprising:
a ten-key pad being comprised of a key mat on which ten-key buttons with respective projections on the under surfaces thereof are laid out and a key circuit board on which respective contacts corresponding to the projections are laid out;
an electrostatic capacity sensing pad for sensing an electrostatic capacity change to detect a touched region and having through holes to be inserted the projections corresponding thereto and being provided with between the key mat and the key circuit board;
a memory controller for storing the touched region detected by the electrostatic capacity sensing pad in a memory;
a locus generator for generating a locus from a set of representative points of each of the touched regions stored in the memory; and
a breakpoint detector for detecting a breakpoint of the locus according to a feature of the touched region.

8. A mobile digital device according to claim 7, wherein the breakpoint detector detects the breakpoint according to a size of the touched region.

9. A mobile digital device according to claim 8, further comprising:
a character recognizer for recognizing a character from the locus generated by the locus generator and the breakpoint detected by the breakpoint detector.

10. A mobile digital device according to claim 7, further comprising:
a direction determiner for determining a touch direction according to a figure of the touched region detected by the electrostatic capacity sensing pad; and
wherein the breakpoint detector detects the breakpoint according to the touch direction.

11. A mobile digital device according to claim 10, further comprising:
a character recognizer for recognizing a character from the locus generated by the locus generator and the breakpoint detected by the breakpoint detector.

12. A mobile digital device according to claim 7, wherein the breakpoint detector detects the breakpoint according to a number of the touched regions detected by the electrostatic capacity sensing pad simultaneously.

13. A mobile digital device according to claim 12, further comprising:
a character recognizer for recognizing a character from the locus generated by the locus generator and the breakpoint detected by the breakpoint detector.

14. A mobile digital device comprising:
a ten-key pad being comprised of a key mat on which ten-key buttons with respective projections on the under surfaces thereof are laid out and a key circuit board on which respective contacts corresponding to the projections are laid out;
an electrostatic capacity sensing pad for sensing an electrostatic capacity change to detect a touched region and having through holes to be inserted the projections corresponding thereto and being provided with a portion having the through holes between the key mat and the key circuit board and with the other portion on a part of a chassis of the mobile digital device;
a memory controller for storing the touched region detected by the electrostatic capacity sensing pad in a memory;
a locus generator for generating a locus from a set of representative points of each of the touched regions stored in the memory;
a direction determiner for determining a touch direction according to a figure of the touched region detected by the electrostatic capacity sensing pad; and
a breakpoint detector for detecting a breakpoint of the locus according to the touch direction determined by the direction determiner.

15. A mobile digital device according to claim 14, wherein the touch direction determined by the direction determiner is a direction held by the user.

16. A mobile digital device comprising:
a ten-key pad being comprised of a key mat on which ten-key buttons with respective projections on the under surfaces thereof are laid out and a key circuit board on which respective contacts corresponding to the projections are laid out;
an electrostatic capacity sensing pad for sensing an electrostatic capacity change to detect a touched region and having through holes to be inserted the projections corresponding thereto and being provided with between the key mat and the key circuit board; and a controller for selecting a function corresponding to a feature of the touched region detected by the electrostatic capacity sensing pad and executing the selected function.

17. A mobile digital device according to claim 16, wherein the controller selects a function corresponded to a size of the touched region detected by the electrostatic capacity sensing pad and executing the selected function.

18. A mobile digital device according to claim 16, further comprising:

a direction determiner for determining a touch direction according to a figure of the touched region detected by the electrostatic capacity sensing pad; and wherein the controller selects a function corresponded to the touch direction determined by the direction determiner and executing the selected function.

19. A mobile digital device according to claim 16, wherein the controller selects a function according to a number of the touched regions detected by the electrostatic capacity sensing pad simultaneously and executing the selected function.

20. A mobile digital device comprising:

a ten-key pad being comprised of a key mat on which ten-key buttons with respective projections on the under surfaces thereof are laid out and a key circuit board on which respective contacts corresponding to the projections are laid out;

an electrostatic capacity sensing pad for sensing an electrostatic capacity change to detect a touched region and having through holes to be inserted the projections corresponding thereto and being provided with between the key mat and the key circuit board;

a memory for storing predetermined functions corresponding to respective small regions provided within a pad region of the electrostatic capacity sensing pad;

a function selector for selecting a function corresponding to a small region in which a representative point of the touched region is situated; and a function controller for controlling the selected function according to a feature of the touched region detected by the electrostatic capacity sensing pad.

21. A mobile digital device according to claim 20, wherein the function controller controls the selected function according to a size of the touched region detected by the electrostatic capacity sensing pad.

22. A mobile digital device according to claim 20, further comprising:

a direction determiner for determining a touch direction according to a figure of the touched region detected by the electrostatic capacity sensing pad; and wherein the function controller controls the selected function according to a touch direction determined by the direction determiner.

23. A mobile digital device according to claim 20, wherein the function controller controls the selected function according to a number of the touched regions detected by the electrostatic capacity sensing pad simultaneously.

* * * * *